United States Patent
Berger et al.

[11] 3,761,478
[45]*Sept. 25, 1973

[54] URACIL UREAS

[75] Inventors: Arthur Berger, Skokie, Ill.; Edeltraut E. Borgaes, Sindelfingen, Germany

[73] Assignee: Baxter Laboratories, Inc., Morton Grove, Ill.

[*] Notice: The portion of the term of this patent subsequent to Aug. 28, 1990, has been disclaimed.

[22] Filed: Dec. 6, 1971

[21] Appl. No.: 205,329

Related U.S. Application Data

[63] Continuation of Ser. No. 849,889, Aug. 13, 1969, abandoned.

[52] U.S. Cl. .......................... 260/256.4 C, 424/251
[51] Int. Cl. ............................................. C07d 51/38
[58] Field of Search ............................. 260/256.4 C

[56] References Cited
FOREIGN PATENTS OR APPLICATIONS
1,219,489   6/1966   Germany Primary Examiner—Alex Mazel
Assistant Examiner—R. V. Rush
Attorney—Walter C. Kehm

[57] ABSTRACT

Uracil ureas having the general formula

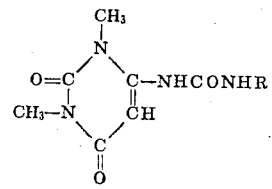

wherein R is selected from the group consisting of lower alkyl having from one to four carbon atoms, allyl, cyclohexyl and 2-methylphenyl. Said compounds are useful central nervous system anti-depressants.

10 Claims, No Drawings formed during the heating period was filtered off after the reaction mixture had cooled to room temperature. The filtrate was poured into crushed ice and the resulting white precipitate collected and washed with water. On drying, this solid weighed 114 grams (69 percent of the theoretical) and had a melting point of 109.8°C. One recrystallization from methanol raised the melting point to 128.1°C and a second crystallization from the same solvent yield high purity 1-n-butyl-3-(2,4-diketo-1,3-dimethyl-1,2,3,4-tetrahydropyrimidin-6-yl) urea, m.p. 129.1°C.

Other examples of the uracil ureas of the present invention were synthesized according to the procedure of the above examples. The analytical data determined for these compounds are set forth in the following table:

TABLE I.—ANALYTICAL DATA ON URACIL UREAS

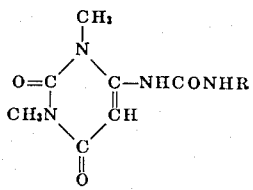

| | | | Analysis, percent | | | | | |
|---|---|---|---|---|---|---|---|---|
| | Melting | Empirical | Calculated | | | Found | | |
| R equals | point, °C. | formula | C | H | N | C | H | N |
| CH₃ | 225-7 | C₈H₁₂N₄O₃ | 45.28 | 5.70 | 26.40 | 45.63 | 5.83 | 26.31 |
| C₂H₅ | 168-9 | C₉H₁₄N₄O₃·H₂O | 44.26 | 6.60 | 22.94 | 44.55 | 6.56 | 22.90 |
| Allyl | 155-6 | C₁₀H₁₄N₄O₃ | 50.41 | 5.92 | 23.52 | 50.85 | 6.08 | 23.32 |
| i-C₃H₇ | 177 | C₁₀H₁₆N₄O₃ | 49.99 | 6.71 | 23.32 | 50.10 | 6.66 | 23.37 |
| n-C₃H₇ | 167-8 | C₁₀H₁₆N₄O₃ | 49.99 | 6.71 | 23.32 | 50.36 | 6.81 | 23.34 |
| i-C₄H₉ | 116 | C₁₁H₁₈N₄O₃ | 51.96 | 7.13 | 22.03 | 51.83 | 7.08 | 21.94 |
| n-C₄H₉ | 127-9 | C₁₁H₁₈N₄O₃ | 51.96 | 7.13 | 22.03 | 51.90 | 6.88 | 21.82 |
| C₆H₁₁ | 197-9 | C₁₃H₂₀N₄O₃ | 55.70 | 7.19 | 19.99 | 55.71 | 7.12 | 19.86 |
| 2-CH₃C₆H₄ | 246-8 | C₁₄H₁₆N₄O₃ | 58.32 | 5.59 | 19.43 | 58.72 | 5.70 | 19.50 |

The desirable central nervous system anti-depressant properties of the uracil ureas of this invention are illustrated by the activity of these compounds in protecting mice against lethal doses of pentobarbital sodium (barbiturate antagonist activity). These illustrative results are shown in the following Tables II and III in which the compounds of the present invention are compared with seven reference central nervous system anti-depressants. In this comparison, which is a modification of the procedure reported by Kimura and Richards, *Arch. Intern. Pharmacodyn.*, Vol. 110, pp. 29-42 (1957), the ability of the test compound to reverse a lethal dose of barbiturate is determined. The life or death of the test animals following administration of a lethal dose of the barbiturate and then a trial dose of the test compound is used as the end point to provide the values given in the tables as the effective $BAD_{50}$ (median barbiturate antagonist dose). The margin of safety of the test compound is shown by the ratio of the $LD_{50}$ (median lethal dose) to the effective barbiturate antagonist dose.

In this procedure, the $LD_{50}$'s and $BAD_{50}$'s were determined by subjecting the mice to at least three logarithmically graded doses with 10 mice at each dose level for each compound and calculating according to the procedure of Miller et al., *Proc. Soc'y. Exper. Biol. and Med.*, Vol. 57, p. 261 (1944). The lethal dose of the barbiturate which was administered was the $LD_{90-100}$ (the dose required to kill at least nine of every 10 mice), or 126 mg./kilo of body weight.

TABLE II

Barbiturate antagonist data on uracil ureas, mg./kg., in mice

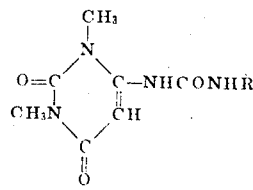

| R equals | $LD_{50}$, i.p. | $BAD_{50}$, i.p. | $LD_{50}/BAD_{50}$ |
|---|---|---|---|
| CH₃ | 25 | 2.5 | 10.0 |
| C₂H₅ | 0.82 | 0.63 | 1.3 |
| Allyl | 4.2 | 0.86 | 4.88 |
| i-C₃H₇ | 162 | 3.95 | 41.0 |
| n-C₃H₇ | 2.06 | 0.172 | 11.9 |
| i-C₄H₉ | 295 | 10.8 | 27.3 |
| n-C₄H₉ | 237 | 1.5 | 158.9 |
| C₆H₁₁ | 522 | 52 | 10.0 |
| 2-CH₃C₆H₄ | ¹ >1,600 | 195 | >8.2 |

¹ Three animals tested at each dose.

TABLE III

Reference CNS Anti-depressants (mg./kg. in mice)

| Name | $LD_{50}$ i.p. | $BAD_{50}$ i.p. | $LD_{50}/BAD_{50}$ |
|---|---|---|---|
| Picrotoxin | 9.2 | 4.8 | 1.9 |
| Bemegride sold under the trademark "MEGIMIDE" | 36 | 24 | 1.5 |
| Pentylenetetrazol sold under the trademark "METRAZOL" | 90 | 39 | 2.3 |
| Methylphenidate sold under the trademark "RITALIN" | 96.5 | inactive at 10-150 | |
| Ethamivan sold under the trademark "EMIVAN" | 37 | inactive at 10-200 | |
| caffeine citrate | 540 | inactive at 35-500 | |
| Nikethamide | 245 | inactive at 150-300 | |

From the results shown in the above tables it can be seen that six of the compounds of the present invention are more active than the seven reference compounds. Most importantly, the safety margins of eight of the novel compounds of the present invention are better than any of the reference compounds and six have safety margins of 10 or greater than 10.

Various modifications, adaptations and further examples of the present invention can be devised, after reading the foregoing specification and the claims appended hereto, by the person skilled in the art without departing from the spirit and scope of the invention. Thus, it will be apparent that various mutual solvents other than dimethylformamide and dimethylsulfoxide

URACIL UREAS

This is a continuation of application Ser. No. 849,889, filed Aug. 13, 1969, now abandoned.

The present invention relates to novel organic uracil ureas. More particularly, this invention relates to ring substituted uracil ureas having the general formula:

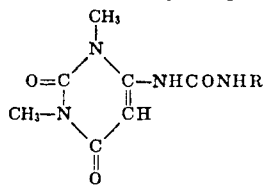

wherein R is selected from the group consisting of lower alkyl having from one to about four carbon atoms, allyl, cyclohexyl and 2-methylphenyl.

The compounds of the present invention have been found to have potent central nervous system antidepressant activity in animals. The ability of these compounds to revive animals given large doses of barbiturates has been shown in mice, rabbits and dogs. As such, the compounds of the present invention are useful agents for these and other animals as narcotic, barbiturate and anesthetic antagonists and as psychomotor and respiratory stimulants. These compounds are new compounds which have not been described heretofore in the literature and have unique barbiturate antagonist properties. Certain 5-substituted positional isomers of the present compounds have been described heretofore as chemical intermediates for anti-cancer agents by Johnston et al., *J. Med. Chem.*, Vol. 6, pp. 669–81 (1963). However, the 5-substituted uracil ureas were found to be inactive central nervous system antidepressants.

The synthesis of the novel uracil ureas of the present invention can be effected by reacting 6-amino-1,3dimethyluracil with an appropriate isocyanate. This synthesis is facilitated by reaction in the presence of a mutual solvent such as an amide, for example, dimethylformamide, or a sulfoxide, for example, dimethylsulfoxide.

The general reaction can be described by the following equation:

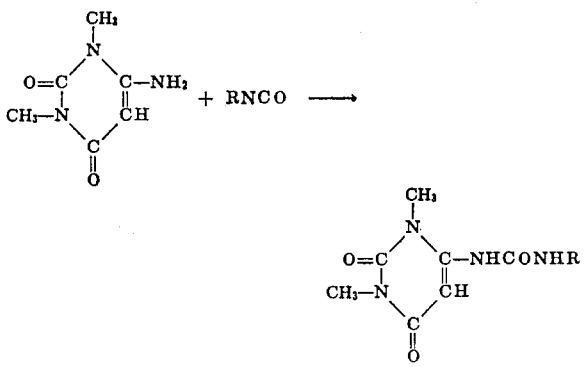

wherein R is as previously defined.

Illustrative of the isocyanates which can be used in the above reaction are the methyl, ethyl, n-propyl, isopropyl, n-butyl, isobutyl, allyl, cyclohexyl and 2-methylphenyl isocyanates and the like. The isocyanate reagents are generally available commercially or can be made by conventional procedures, for example, by reaction of an amine and phosgene as described in "Organic Syntheses," Coll. Vol. II, A. H. Blatt, ed., pp. 453–5, and Coll. Vol. IV, N. Rabjohn, ed., pp. 521–4, John Wiley & Sons, Inc., New York and London.

The compound 6-amino-1,3-dimethyluracil also is generally available commercially or can be made by conventional procedures, for example, by reaction of 1,3-dimethylurea with ethyl cyanoacetate as described by Traube, *Ann.*, Vol. 432, p. 281 (1923).

Although specific methods of preparation of the novel uracil ureas of the present invention are described herein, it will be understood that these compounds are not limited to these specific methods of preparation. For example, an alternative method of preparation consists of methylating the ring unsubstituted uracil urea. Other methods of preparation of these compounds can be devised by those skilled in the art.

The novel compounds of the present invention have been administered both intravenously (i.v.) and intraperitoneally (i.p.) in suspensions of pectin and gum acacia solutions and in alcohol-water solutions. These routes of administration as well as the oral route of administration can be used. Other methods of administration will be apparent to those skilled in the art.

Effective barbiturate antagonist dosages can range from about 1 to 1,000 mg. per kg. of body weight and can take the form of tablets, powders, capsules, elixirs and the like dosage forms in admixture with common solid and liquid diluents, carriers and adjuvants such as, for example, cornstarch, lactose, talc, stearic acid, magnesium stearate, gelatin, acacia and locust bean gums, alcohol, water, vegetable oils and the like materials. Other effective dosages of the novel compounds can be determined by reference to the specific examples set forth hereinafter. It has been unexpectedly found that high dosages of these compounds lose their toxicity in the presence of the active barbiturates and thus appear to be less toxic in the presence than in the absence of barbiturates.

The following examples will further illustrate the present invention although the invention is not limited to these specific examples. All percentages and parts herein are on a weight basis unless otherwise specified.

EXAMPLE I

Synthesis of 1-(2,4-Diketo-1,3-Dimethyl-1,2,3,4-Tetrahydropyrimidin-6-yl)-3-Ethylurea A mixture of 15.5 grams (0.1 mole) of 6-amino-1,3-dimethyl uracil and 12 ml. (an excess) of ethyl isocyanate in 200 ml. of dimethylformamide was refluxed for about 20 hours. The mixture was allowed to cool to room temperature, then poured into crushed ice with stirring. The precipitate which formed was collected on a filter, then recrystallized from methanol. The white product thus obtained after drying corresponded to 1-(2,4-diketo-1,3-dimethyl-1,2,3,4-tetrahydropyrimidin-6-yl)-3-ethylurea as the monohydrate, weight 18.1 grams (74.2 percent of the theoretical) with a melting point of 168°–169°C.

EXAMPLE II

Synthesis of 1-n-Butyl-3-(2,4-Diketo-1,3-Dimethyl-1,2,3,4-Tetrahydropyrimidin-6-yl) Urea A mixture of 101 grams (0.65 mole) of 6-amino-1,3-dimethyl uracil, 124 ml. (1.1 moles) of n-butyl isocyanate and 800 ml. of dimethylformamide was heated under reflux for 3 hours. A white precipitate which can be used for the reaction of 6-amino-1,3-dimethyluracil with isocyanate to prepare the novel uracil ureas of the present invention and various methods of purification of these novel compounds other than recrystallization from methanol will be apparent to those skilled in the art. So also, the reaction conditions of temperature, time and proportions of reactants can be modified from those illustrated in the specific examples. When solvent media is used for the synthesis of the uracil ureas, it is preferred to use dimethylformamide at reflux temperature. In this synthesis the 6-amino-1,3-dimethyluracil is generally reacted with about a molar equivalent or an excess of the isocyanate at reflux temperature. An effective barbiturate antagonist dose of the uracil ureas can be formulated in any conventional dosage form for administration, including admixtures with many solid and liquid diluents, carriers and adjuvants other than those previously described. These dosages can be administered to revive animals given an overdose of barbiturates, sedatives and hypnotics such as, for example, pentobarbital sodium, phenobarbital, phenobarbital sodium, chloral hydrate and the like substances.

What is claimed is:
1. A uracil urea having the formula

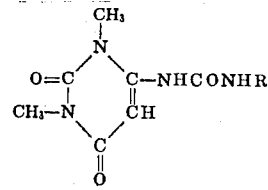

wherein R is selected from the group consisting of lower alkyl having from one to four carbon atoms, allyl, cyclohexyl and 2-methylphenyl.

2. The uracil urea of claim 1 in which R is methyl.
3. The uracil urea of claim 1 in which R is ethyl.
4. The uracil urea of claim 1 in which R is n-propyl.
5. The uracil urea of claim 1 in which R is isopropyl.
6. The uracil urea of claim 1 in which R is n-butyl.
7. The uracil urea of claim 1 in which R is isobutyl.
8. The uracil urea of claim 1 in which R is allyl.
9. The uracil urea of claim 1 in which R is cyclohexyl.
10. The uracil urea of claim 1 in which R is 2-methylphenyl.

* * * * *